US006389351B1

United States Patent
Egawa et al.

(10) Patent No.: US 6,389,351 B1
(45) Date of Patent: May 14, 2002

(54) PRECEDING VEHICLE FOLLOW-UP CONTROL SYSTEM

(75) Inventors: Kenichi Egawa, Tokyo; Tetsuya Asada, Kanagawa; Satoshi Tange, Kanagawa; Akira Higashimata, Kanagawa, all of (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 09/592,566

(22) Filed: Jun. 12, 2000

(30) Foreign Application Priority Data

Jun. 15, 1999 (JP) ............................................ 11-168264

(51) Int. Cl.$^7$ .............................................. G01S 13/93
(52) U.S. Cl. ........................... 701/93; 701/96; 701/301; 342/70; 342/71; 340/903
(58) Field of Search ............................ 701/96, 93, 300, 701/301; 340/903, 904; 342/70, 71, 72; 180/167, 169

(56) References Cited

U.S. PATENT DOCUMENTS

| 4,622,636 A | 11/1986 | Tachibana ................... 364/424 |
| 5,396,426 A | 3/1995 | Hibino et al. ........... 364/426.04 |
| 5,731,977 A | 3/1998 | Taniguchi et al. ..... 364/426.044 |
| 5,959,572 A | * 9/1999 | Higashimata et al. ......... 342/70 |
| 6,070,682 A | 6/2000 | Isogai et al. ................. 180/167 |
| 6,298,298 B1 | 10/2001 | Tange et al. ................... 701/96 |

FOREIGN PATENT DOCUMENTS

| DE | 19743546 A1 | 4/1998 |
| EP | 0484995 A2 | 5/1992 |
| EP | 0 874 149 A2 | 10/1998 |
| JP | 10-114237 | 5/1998 |

* cited by examiner

*Primary Examiner*—Tan Nguyen
*Assistant Examiner*—Arthur D. Donnelly
(74) *Attorney, Agent, or Firm*—Foley & Lardner

(57) ABSTRACT

A preceding-vehicle follow-up control system is arranged to calculate a target vehicle speed employed for bringing a detected vehicle-to-vehicle distance closer to a target vehicle-to-distance, to control the controlled-vehicle speed to bring a controlled-vehicle speed closer to the target vehicle speed, to decelerate the controlled-vehicle speed to a set vehicle speed at a rate of a preset deceleration when the controlled-vehicle speed is greater than a control continuation decision value greater than an upper limit of the set vehicle speed and when the accelerating operation is terminated. This arrangement provides a smooth drive feeing to a driver even after an acceleration of the controlled vehicle is executed during a follow-up control and is terminated.

11 Claims, 8 Drawing Sheets

FIG.10

PRECEDING VEHICLE FOLLOW-UP CONTROL SYSTEM

BACKGROUND OF THE INVENTION

The present invention relates to a preceding vehicle follow-up control system for enabling a controlled vehicle to recognize a preceding vehicle and to follow up the preceding vehicle while keeping a vehicle-to-vehicle distance.

Japanese Patent Provisional Publication No. 10-114237 has disclosed a conventional follow-up control system which is arranged to cancel a follow-up control according to an accelerating condition of the controlled vehicle.

SUMMARY OF THE INVENTION

Although this conventional preceding vehicle follow-up control system is basically arranged to stop the follow-up control when a difference between the throttle opening detected value and the throttle opening estimate becomes greater than a threshold, it is arranged to automatically resume the follow-up control when an accelerator pedal is released. This arrangement yet includes problems to be improved in drive feeling.

It is therefore an object of the present invention to provide a preceding vehicle follow-up control system which smoothly resume a follow-up control after canceling the follow-up control during an acceleration based on a driver's demand.

A preceding vehicle follow-up control system according to the present invention is for a vehicle and comprises a vehicle-to-vehicle distance detector, a vehicle speed detector, an accelerating operation detector and a controller connected thereto. The vehicle-to-vehicle distance detector detects a distance between a controlled vehicle and a preceding vehicle and outputs a signal indicative of the vehicle-to-vehicle distance. The vehicle speed detector that detects a vehicle speed of the controlled vehicle and outputs a signal indicative of the controlled-vehicle speed. The accelerating operation detector that detects whether an accelerating operation based on a driver's demand is executed. The controller is arranged to calculate a target vehicle speed employed for bringing the vehicle-to-vehicle distance closer to a target vehicle-to-distance on the basis of the vehicle-to-vehicle distance and the controlled-vehicle speed, to control the controlled-vehicle speed to bring the controlled-vehicle speed closer to the target vehicle speed, to detect whether the controlled-vehicle speed is greater than a control continuation decision value which is greater than an upper limit of a settable range of a set vehicle speed, to decelerate the controlled-vehicle speed to the set vehicle speed at a rate of a preset deceleration when the controlled-vehicle speed is greater than the control continuation decision value and when the accelerating operation is not executed.

DETAILED DESCRIPTION OF THE INVENTION

Referring to FIGS. 1 to 8C, there is shown a first embodiment of a preceding vehicle follow-up control system according to the present invention.

Figure 1:
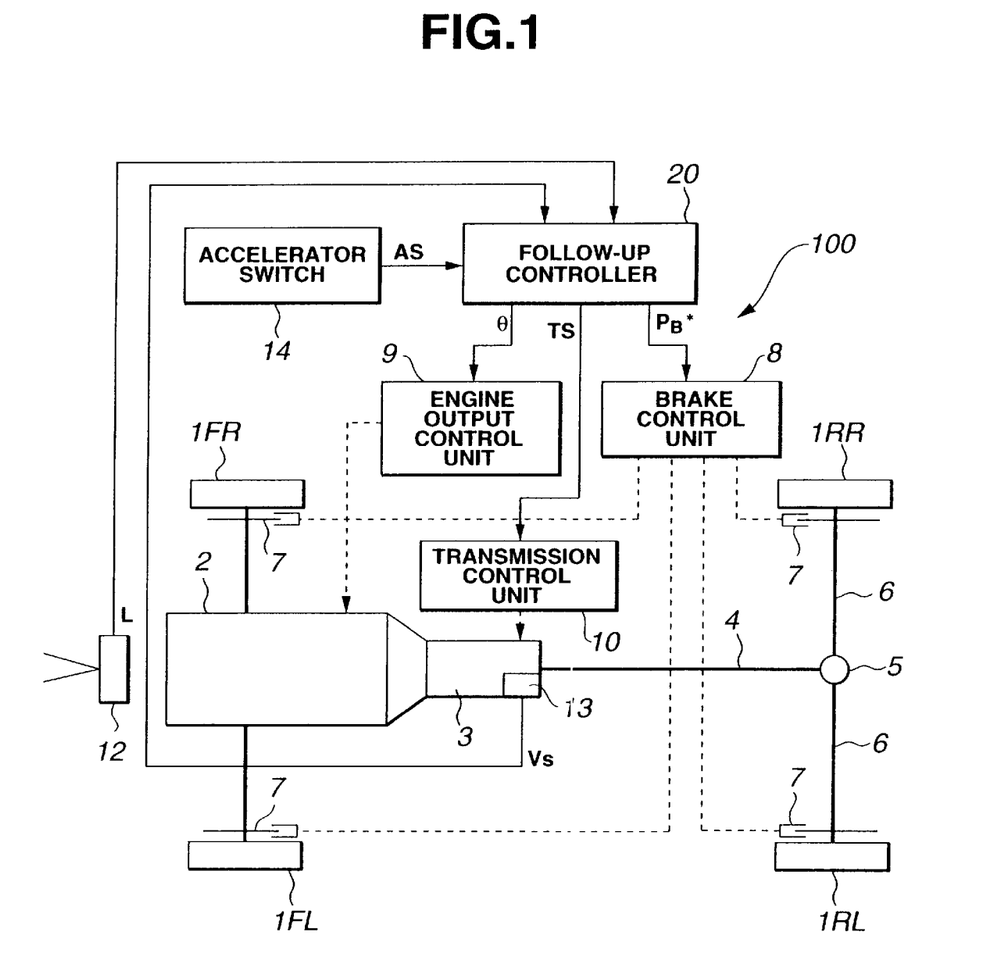
FIG. 1 is a schematic view showing a construction of a first embodiment of a preceding vehicle follow-up control system according to the present invention.

As shown in FIG. 1, the preceding vehicle follow-up control system is employed in an automotive vehicle 100. The vehicle 100 has front wheels 1FL and 1FR functioning as a driven wheel, and rear wheels 1RL and 1RR functioning as a drive wheel. The vehicle 100 is equipped with an internal combustion engine 2, an automatic transmission 3 coupled to the engine 100, and a braking system (no numeral). The engine 2 generates driving force and transfers it through the automatic transmission 3, a propeller shaft 4, a final reduction gear unit 5 and an axle 6 to the rear wheels 1RL and 1RR.

The braking system comprises four disc brakes 7 which are installed to the four wheels 1FL, 1FR, 1RL and 1RR, respectively, and a brake control unit 8 which controls braking hydraulic pressure of the disc brakes 7. The brake control unit 8 is arranged to pressurize the brake hydraulic according to a depression degree of a brake pedal (not shown) and supplies the pressurized brake hydraulic to the disc brakes 7. Further, the brake control unit 8 pressurizes the brake hydraulic according to a magnitude of a brake pressure command outputted from a follow-up controller 2 and supplies the pressurized brake hydraulic to the disc brakes 7.

The engine 2 is provided with an engine output control unit 9 for controlling an output of the engine 2. The engine output control unit 9 controls the output of the engine 2 by a method for controlling an opening of a throttle valve of the engine 2. It will be understood that another method may be employed. For example, a method of controlling an idling rotation speed by controlling an opening of an idle control valve may be employed.

The automatic transmission 3 is coupled to a transmission control unit 10 for controlling a shift position of the automatic transmission 3. When the transmission control unit 10 receives an OD inhibition signal TS set at 1 (logic value), the transmission control unit 10 inhibits to select a fourth speed (OD: over drive) in the automatic transmission 3, and therefore the shift position is forcibly changed from the fourth speed to a third speed. Thereafter, when the logic value of the OD prohibition signal TS is turned to 0, the shift position set at the third speed is changed to the fourth speed.

A vehicle-to-vehicle distance sensor 12 is installed at a front and lower portion of the vehicle 100. The vehicle-to-vehicle distance sensor 12 is of a radar type arranged to sweepingly output laser beam to a forward side of the vehicle 100 and to receive light reflected by a preceding vehicle. It will be understood that radio wave or ultrasonic wave instead of laser beam may be employed in the vehicle-to-vehicle distance sensor 12 to measure a vehicle-to-vehicle distance.

Further, the vehicle 100 is provided with a vehicle speed sensor 13 installed at an output side of the automatic transmission 3 and an accelerator switch 14 installed to an accelerator pedal (not shown). The vehicle speed sensor 13 detects a vehicle speed Vs of the controlled vehicle 100 by detecting a rotation speed of an output shaft of the automatic transmission 3. The accelerator switch 14 detects the depression of the accelerator pedal and outputs a switch signal SA which takes a logic value "1" when the accelerator pedal is depressed and which takes a logic value "0" when the accelerator pedal is not depressed.

A follow-up controller 20 is further connected to the vehicle-to-vehicle distance sensor 12, the vehicle speed sensor 13 and the accelerator switch 14 and receives the signals therefrom. The follow-up controller 20 executes a follow-up control for following up a preceding vehicle while keeping a proper vehicle-to-vehicle distance between the preceding vehicle and the controlled vehicle 100. More specifically, the follow-up control is executed by controlling the brake control unit 8, the engine output control unit 9 and the transmission control unit 10 on the basis of the vehicle-to-vehicle distance L detected by the vehicle-to-vehicle distance sensor 12, a controlled-vehicle speed Vs detected by the vehicle speed sensor 13. Further, the follow-up controller 20 executes a deceleration control in and the switch signal AS of the accelerator switch 4.

Figure 2:
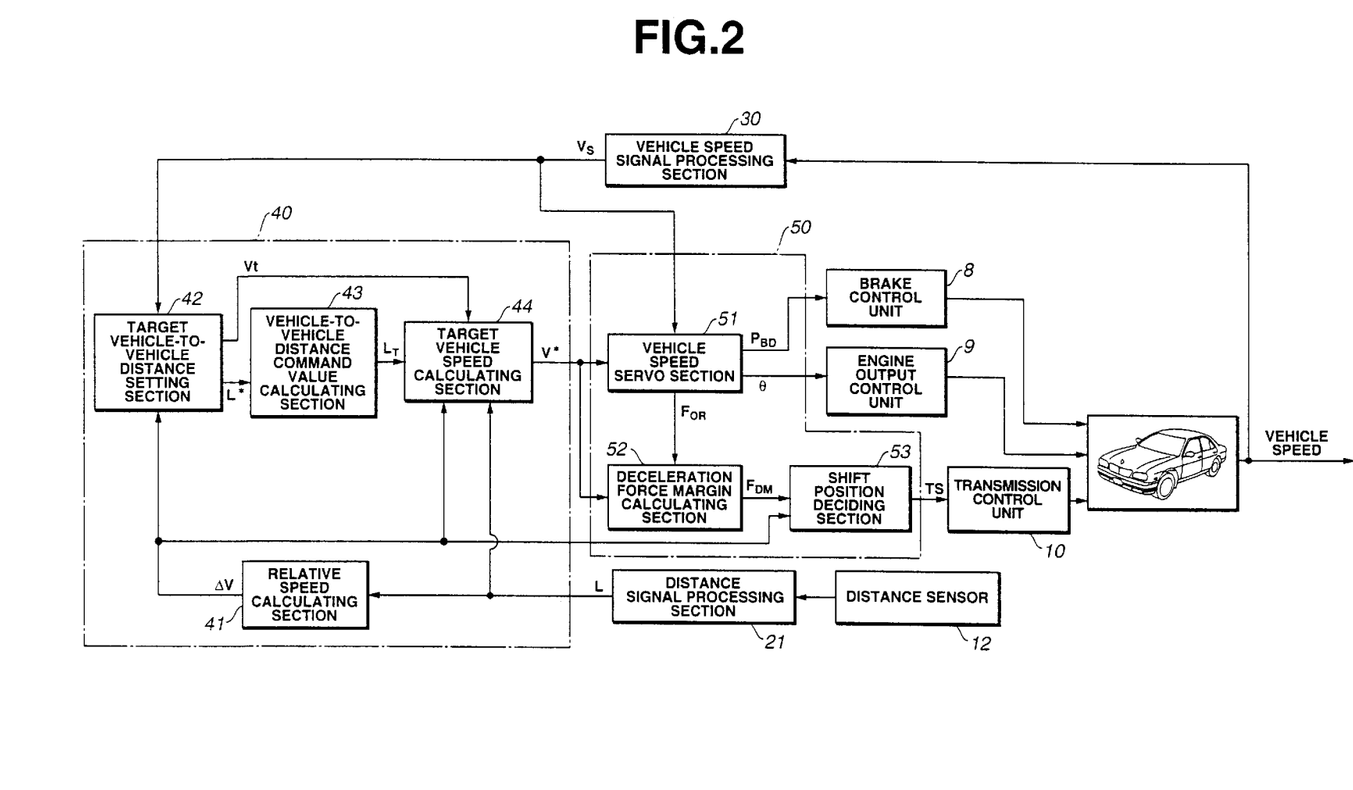
FIG. 2 is a block diagram showing a control system of a follow-up controller of the first embodiment.

The follow-up controller 5 comprises a microcomputer and peripheral decides thereof and further comprises a control block in the form of software previously stored therein as shown in FIG. 2. This control block shown in FIG. 2 is constituted by a distance signal processing section 21, a vehicle speed signal processing section 30, a vehicle-to-vehicle distance control section 40 and a vehicle speed control section 50.

The distance signal processing section 21 measures a time period from a moment that the laser beam outputted from the vehicle-to-vehicle distance sensor 12 to a moment that the reflected beam of the preceding vehicle is received. The distance signal processing section 21 calculates the vehicle-to-vehicle distance L to the preceding vehicle on the basis of the measured time period. The vehicle speed signal processing section 30 measures a cycle of a vehicle speed pulse outputted from the vehicle speed sensor 13 and calculates the controlled-vehicle speed Vs of the controlled vehicle 100. The vehicle-to-vehicle distance control section 40 calculates a target vehicle speed V* for maintaining the vehicle-to-vehicle distance L at a target vehicle-to-vehicle distance L*, on the basis of the vehicle-to-vehicle distance L calculated in the distance signal processing section 21 and the controlled-vehicle speed Vs calculated in the vehicle speed processing section 30. The vehicle speed control section 50 controls the brake control unit 8, the engine output control unit 9 and the transmission control unit 10.

The vehicle-to-vehicle distance control section 40 comprises a relative speed calculating section 41, a target vehicle-to-vehicle distance setting section 42, a vehicle-to-vehicle distance command value calculating section 43 and a target vehicle speed calculating section 44. The relative speed calculating section 41 calculates a relative speed ΔV of the controlled vehicle 100 with respect to the preceding vehicle on the basis of the vehicle-to-vehicle distance L inputted from the distance signal processing section 21. The target vehicle-to-vehicle distance setting section 42 calculates the target vehicle-to-vehicle distance L* between the preceding vehicle and the controlled vehicle 100 on the basis of the controlled-vehicle speed Vs inputted from the vehicle speed signal processing section 30. The vehicle-to-vehicle distance command value calculating section 43 calculates a vehicle-to-vehicle distance command value $L_T$ for bringing the actual vehicle-to-vehicle distance L closer to the target vehicle-to-vehicle distance L* on the basis of the relative speed ΔV and the target vehicle-to-vehicle distance L* and from a norm model employing a damping coefficient ξ and a natural frequency ω. The target vehicle speed calculating section 44 calculates the target vehicle speed V* for bringing the vehicle-to-vehicle distance L closer to the vehicle-to-vehicle distance command value $L_T$, on the basis of the vehicle-to-vehicle distance command value $L_T$ calculated at the vehicle-to-vehicle distance command value calculating section 43.

The relative speed calculating section 41 is constituted by a band-pass filter which is arranged to execute a band-pass filtering process as to the vehicle-to-vehicle distance L. A transfer function of the band-pass filter can be expressed by the equation (1). Since the numerator of the equation (1) includes a differential term of Laplace operator s, the relative speed calculating section 41 practically differentiates the vehicle-to-vehicle distance L to approximately obtain the relative speed ΔV.

$$F(s)=\omega_c^2 s/(s^2+2\zeta\omega_c s+\omega_c^2) \tag{1}$$

where $\omega_c=2\pi f c$, s is the Laplace operator, and $\zeta_C$ is a damping coefficient.

By employing the band-pass filter, it becomes possible to avoid influence to the vehicle behavior. This influence includes influence of noise and fluctuation during the follow-up control in the case that the relative speed ΔV is calculated by executing a simple differential calculation from the variation of the vehicle-to-vehicle distance L per time unit. The cutoff frequency $f_C$ in the equation (1) is determined from the magnitude of noise component included in the vehicle-to-vehicle distance L and a fluctuation tolerance of the longitudinal acceleration of the vehicle 100 in short cycle. Further, it will be understood that a high-pass filter instead of the band-pass filter may be employed for the calculation of the relative speed so as to execute a differential process of the vehicle-to-vehicle distance L through a high-pass filter process.

The target vehicle-to-vehicle distance setting section 42 calculates the target vehicle-to-vehicle distance L* on the basis of a preceding vehicle speed Vt (=Vs+ΔV) obtained by a time gap $T_0$ between vehicles and from the following equation (2):

$$L^*=Vt \times T_0+L_S \tag{2}$$

where the time gap $T_0$ is a time period necessary that the controlled vehicle 100 approaches a predetermined distance L0 behind the preceding vehicle, and $L_S$ is a vehicle-to-vehicle distance at a stopping state.

By employing a time gap between vehicles, it is possible to set the vehicle-to-vehicle distance so that the higher the vehicle speed becomes, the larger the vehicle-to-vehicle distance becomes.

Further, the vehicle-to-vehicle distance command calculating section 43 calculates the vehicle-to-vehicle distance command value $L_T$ on the basis of the vehicle-to-vehicle distance L and the target vehicle-to-vehicle distance L*. The vehicle-to-vehicle distance command value $L_T$ is a command value for executing a follow-up traveling while keeping the vehicle-to-vehicle distance L at the target distance L*. More specifically, the vehicle-to-vehicle distance command value $L_T$ is calculated by executing a low-pass filter treatment of a second-order lag with respect to the target vehicle-to-vehicle distance L*. The low-pass filter process of a second-order lag is executed by employing a norm model $G_T(s)$ expressed by the following equation (3) using the damping coefficient ζ and the natural frequency ω determined for setting a response characteristic in the vehicle-to-vehicle distance control system at a target response characteristic:

$$G_T(s) = \frac{\omega_n^2}{(s^2 + 2\zeta\omega_n s + \omega_n)}. \quad (3)$$

Furthermore, the target vehicle speed calculating section 44 calculates the target vehicle speed V* on the basis of the vehicle-to-vehicle speed command value $L_T$ and by using the feedback compensator. More specifically, the target vehicle speed V* is calculated by subtracting a linear combination of a product of a difference $(L_T-L)$ and a distance control gain fd and a product of the relative speed ΔV and a speed control gain fv as expressed by the following equation (4):

$$V^* = Vt - \{fd(L_T-L) + fv \cdot \Delta V\} \quad (4)$$

The vehicle speed control section 50 controls the opening of the throttle valve through the engine output control unit 9, the shift position through the transmission control unit 10 and the brake pressure command value $P_{BD}$ through the brake control unit 8 so as to bring the controlled-vehicle speed Vs closer to the target vehicle speed V*. That is, the vehicle speed control section 50 comprises a vehicle speed servo section 51, a deceleration force margin calculating section 52 and a shift position deciding section 53. The vehicle speed servo section 51 calculates a target driving/braking force (target driving force) $F_{OR}$. The deceleration force margin calculating section 52 calculates a deceleration force margin $F_{DM}$ on the basis of the target driving/braking force $F_{OR}$ and the target vehicle speed V*. The shift position deciding section 53 executes a decision of the shift position on the basis of the deceleration force margin $F_{DM}$ calculated at the deceleration-force margin calculating section 52 and the relative speed ΔV calculated at the relative speed calculating section 41.

Figure 3:
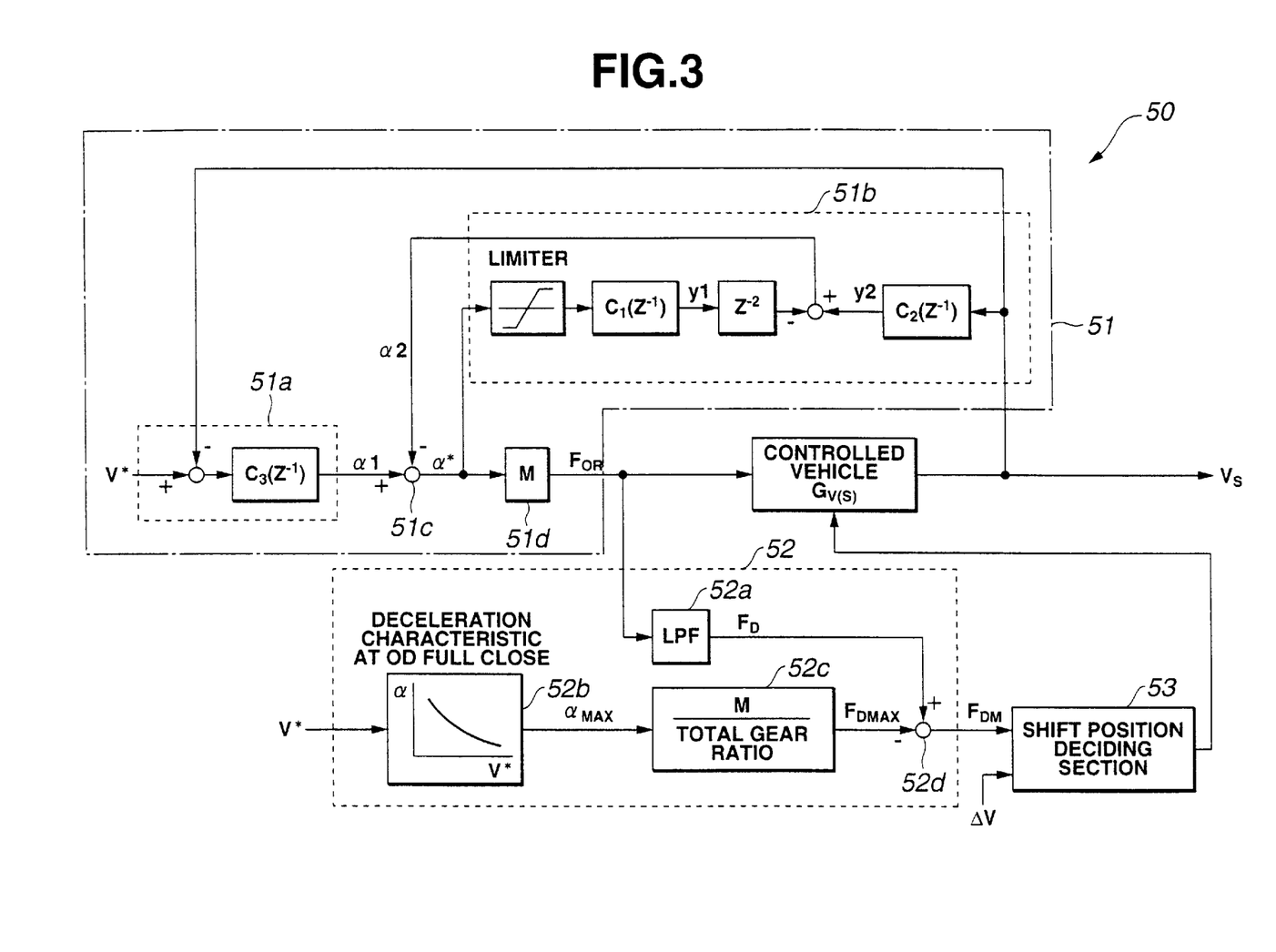
FIG. 3 is a block diagram showing a detailed construction of a vehicle speed control section of FIG. 2.

The vehicle speed servo section 51 is designed by the robust matching control method as shown in FIG. 3 so as to be a servo system which is strong against disturbance including a fluctuation of a road slope. Assuming that the transfer characteristic of the controller object in this servo system 51 is a pulse transfer function $P(z^{-1})$, each compensator of this servo system is represented as shown in FIG. 3, where z is a time lag operator, and z-1 is the time-lag operator at a one sampling-cycle previous time.

The vehicle speed servo section 51 comprises, as shown in FIG. 3, a model matching compensator 51a, a robust compensator 51b, a subtracter 51c and a multiplier 51d. The robust compensator 51a functions as a disturbance compensator. The subtracter 53 calculates a target acceleration α* by subtracting a disturbance estimate α2 outputted from the robust compensator 51b from an acceleration command value α1 outputted from the model matching compensator 51a. The multiplier 54 calculates the target driving/braking force $F_{OR}$ by multiplying the target acceleration α* and the vehicle weight M ($F_{OR}=\alpha^* \times M$). The model matching compensator 51a is arranged such that the response characteristic of the controlled object (controlled vehicle) having an input of the target vehicle speed V* and the output of the actual vehicle speed V corresponds to the characteristic of the norm model $H(z^{-1})$ having previously-set first-order lag and dead-time. By setting a part having an input of the target acceleration α* and an output of the actual controlled-vehicle speed Vs as a controlled object, the pulse transfer function is expressed by a product of an integral element $P1(z^{-1})$ expressed by the equation (5) and a dead-time element $P2(z^{-1})=z^{-2}$, where T is a sampling cycle.

$$P1(z^{-1}) = T \cdot z^{-1}/(1-z^{-1}) \quad (5)$$

Compensators C1(z-1) and C2(z-1) of the robust compensator 51b are expressed by the following equations (6) and (7):

$$C1(z^{-1}) = (1-\gamma) \cdot z^{-1}/(1-\gamma \cdot z^{-1}) \quad (6)$$

$$C2(z^{-1}) = (1-\gamma) \cdot (1-z^{-1})/T \cdot (1-\gamma \cdot z^{-1}) \quad (7)$$

where γ=exp(−T/Tb).

By neglecting the dead-time of the controlled object and setting a first-order low-pass filter having a time constant Ta as a norm model, a feedback compensator C3 of the model matching compensator 51a is expressed by a constant as shown by the following equation (8):

$$C3=K=\{1-\exp(-T/Ta)\}/T \quad (8)$$

The deceleration-force margin calculating section 52 comprises, as shown in FIG. 3, a filter 52a, a maximum deceleration calculating section 52b, a multiplying section 52c and a subtracter 52d. The filter 52a outputs a deceleration demand value $F_D$ by executing a filtering treatment of 0.5 Hz as to the target driving/braking force $F_{OR}$ in order to prevent the shift down and the shift hunting from frequently generating. The maximum deceleration calculating section 52b receives the target vehicle speed V* and calculates a maximum deceleration $\alpha_{MAX}$ from the target vehicle speed V* arid with reference to a stored table indicative of a relationship between the deceleration a and the vehicle speed V during a full close state of the throttle valve at the fourth speed (OD) shift position. The multiplying section 52c calculates a maximum deceleration force $F_{DMAX}$ at the fourth speed (OD) shift position by multiplying the maximum deceleration $\alpha_{MAX}$ and a value (M/total gear ratio) obtained by dividing the vehicle weight M by a total speed ratio (fourth speed gear ratio×final reduction gear ratio). The subtracter 52d calculates a maximum deceleration force margin $F_{DM}$ by subtracting the maximum deceleration force $F_{DMAX}$ from the deceleration force demand value $F_D$.

The shift position deciding section 53 decides whether the fourth speed (OD) is inhibited, on the basis of the relative speed ΔV, the deceleration force margin $F_{DM}$, a preset down-shift threshold $T_{HD}$ and a preset up-shift threshold $T_{HU}$. More specifically, the shift position deciding section 53 outputs an OD inhibiting control signal of the logic value "1" indicative of inhibiting to take the fourth speed (OD) when the automatic transmission 3 is set at the fourth speed (OD) and when $F_{DM} \leq 0$ and $\Delta V \leq 0$. Further, the shift position deciding section 53 outputs an OD forbidding control signal of the logic value "0" indicative of allowing to take the fourth speed (OD) when the automatic transmission 3 is set at the third speed and when $F_{DM} \geq T_{HU}$ and ΔV>0.

Figure 4:
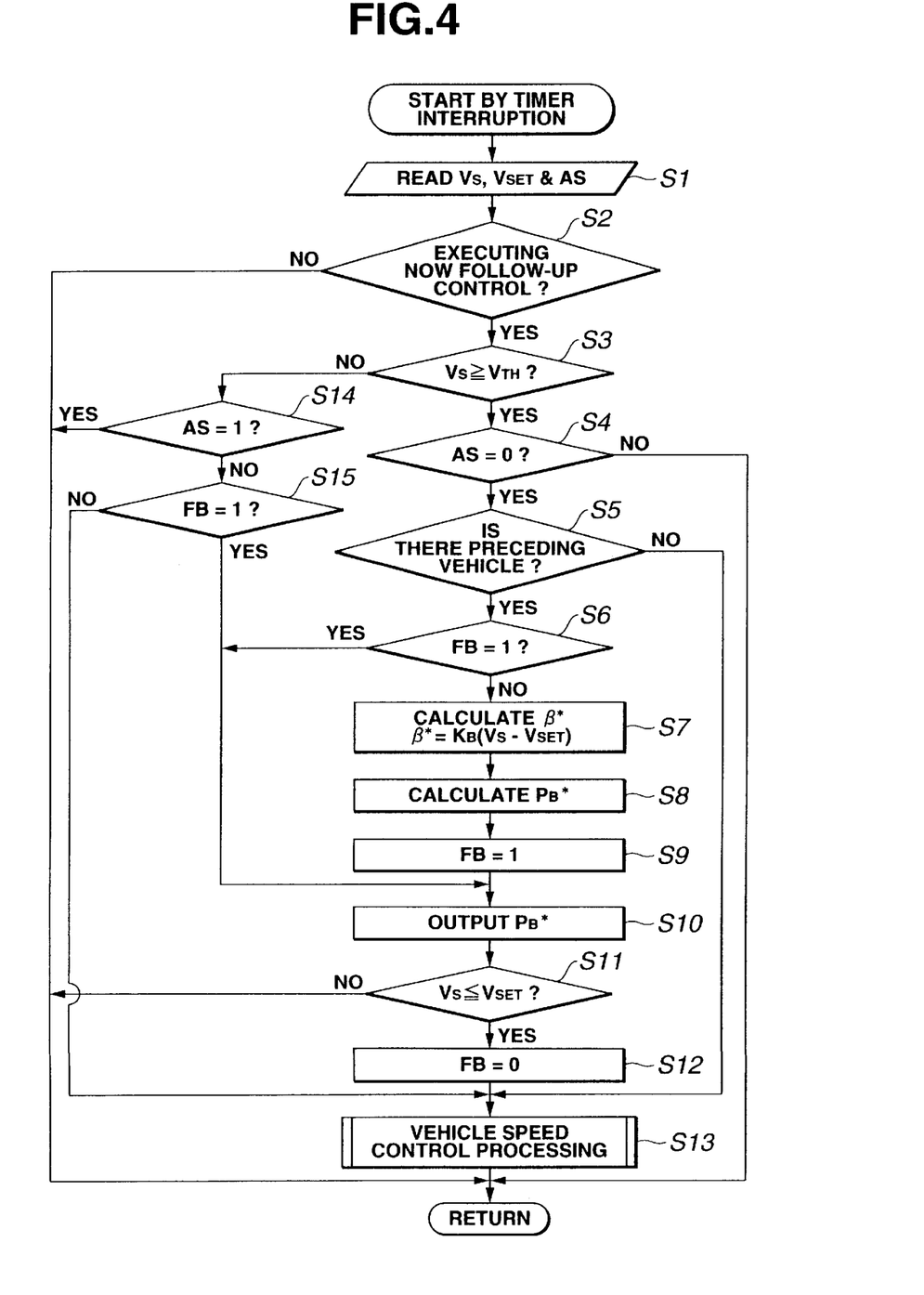
FIG. 4 is a flowchart showing a vehicle speed control computing process executed by the vehicle speed control section.

The vehicle speed control section 50 executes the vehicle control calculating process shown in FIG. 4 at a predetermined sampling cylinder (10 msec) as a timer interruption process of a predetermined main program.

At a step S1, the follow-up controller 20 reads the controlled vehicle speed Vs, the set vehicle speed $V_{SET}$ set by a driver and the switch signal SA of the accelerator switch 14.

At a step S2, the follow-up controller 20 decides whether the follow-up control is being executed now or not. When the decision at the step S2 is affirmative, the routine proceeds to a step S3. When the decision at the step S2 is negative, the routine proceeds to a return step to terminate the present routine.

At the step S3, the follow-up controller 20 decides whether the controlled-vehicle speed $V_{SET}$ is greater than or equal to a control continuation deciding threshold $V_{TH}$ or not. The control continuation deciding threshold $V_{TH}$ is set at a value greater than a settable (allowable) upper limit $V_{LMAX}$ by 10 km/h. The upper limit $V_{LMAX}$ is a maximum value in an allowed range of the set vehicle speed $V_{SET}$. When the decision at the step S3 is affirmative, the routine proceeds to a step S4. When the decision at the step S3 is negative, the routine proceeds a step S14.

At the step S4, the follow-up controller 20 decides whether or not the logic value of the switch signal AS is 0. When the decision at the step S4 is affirmative (AS=0), that is, when it is decided that the accelerator pedal is released according to a demand of the driver to terminate the acceleration of the controlled vehicle, the routine proceeds to a step S5. When the decision at the step S4 is negative (AS=1), that is, when it is decided that the accelerator pedal is depressed according to the demand of the driver to put the controlled vehicle in the accelerating condition, the routine jumps to the return step to terminate the present timer interruption routine.

At the step S5, the follow-up controller 20 reads the actual vehicle-to-vehicle distance L and compares it with a preset value. More specifically, the follow-up controller 20 decides whether or not there is a preceding vehicle within a predetermined ahead distance. When the actual vehicle-to-vehicle distance L is smaller than the preset value, the follow-up controller 20 decides that there is a preceding vehicle to be followed up (affirmative decision), and therefore the routine proceeds to a step S6. When the actual vehicle-to-vehicle distance L is greater than or equal to the preset value, the follow-up controller 20 decides that there is no preceding vehicle to be followed up (negative decision), and therefore the routine jumps to a step S13.

At the step S6, the follow-up controller 20 decides whether or not a deceleration flag FB is set at 1 indicative of the execution of a deceleration control. When the decision at the step S6 is affirmative, that is, when FB=1, the routine proceeds to a step S10. When the decision at the step S6 is negative, that is, when FB=0, the routine proceeds to a step S7.

At the step S7, the follow-up controller 20 calculates a target deceleration $\beta^*$ by executing the calculation of the following equation (9):

$$\beta^* = K_B(Vs - V_{SET}) \quad (9)$$

where $K_B$ is a constant.

Figure 5:
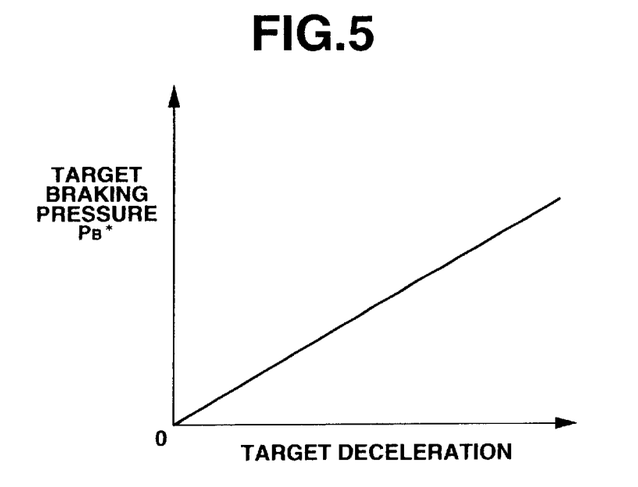
FIG. 5 is a graph showing a relationship between a target deceleration and a target braking pressure.

At a step S8, the follow-up controller 20 calculates a target braking pressure $P_B^*$ on the basis of the target deceleration $\beta^*$ and with reference to mapped data corresponding to a graph of FIG. 5. Further, the follow-up controller 20 updates the target braking pressure $P_B^*$ and stores it in a storage region for the target brake pressure. The graph of FIG. 5 shows a relationship between the target deceleration $\beta^*$ and the target braking pressure $P_B^*$. As is apparent from FIG. 5, the target braking pressure $P_B^*$ takes 0 when the target deceleration $\beta^*$ takes 0, and the target braking pressure $P_B^*$ linearly increases according to the increase of the target deceleration $\beta^*$. That is, the target braking pressure $P_B^*$ is in proportion to the target deceleration $\beta^*$ with an intercept of 0.

At a step S9, the follow-up controller 20 sets the deceleration flag FB at 1 indicative that the deceleration control is now executed (FB=1).

At a step S10, the follow-up controller 20 outputs a throttle opening command value $\theta$ set at 0 to the engine output control unit 9. The throttle opening value $\theta$ set at 0 commands to fully close the throttle valve. Further, the follow-up controller 20 outputs the target braking pressure $P_B^*$ stored in the storage region for the target braking pressure so that the disc brakes 7 generate the braking force corresponding to the target braking pressure $P_B^*$.

At a step S11, the follow-up controller 20 decides whether or not the controlled-vehicle speed Vs is smaller than or equal to the set vehicle speed $V_{SET}$. When the decision at the step S11 is affirmative ($Vs \leq V_{SET}$), the routine proceeds to a step S12. When the decision at the step S11 is negative ($Vs > V_{SET}$), the routine jumps to the return step to terminate the present timer interruption routine.

At the step S12 following to the affirmative decision at the step S11, the follow-up controller 20 resets the deceleration flag FB at 0 (FB=0).

At the step S13 following to the execution of the step S12 or the negative decision at the step S5, the follow-up controller 20 executes the vehicle speed control process for controlling the brake control unit 8, the engine output control unit 9 and the transmission control unit 10 so as to bring the controlled-vehicle speed Vs closer to the target vehicle speed $V^*$ or the set vehicle speed $V_{SET}$.

When the decision at the step S3 is negative ($Vs<V_{TH}$), the routine jumps to the step S14 where the follow-up controller 20 decides whether the logic value of the switch signal AS is set at 1 or not. When the decision at the step S14 is affirmative (AS=1), the routine jumps to the return step to terminate the present routine. When the decision at the step S14 is negative (AS=0), the routine proceeds to a step S15 wherein the follow-up controller 20 decides whether the deceleration flag FB is set at 1 or not. When the decision at the step S14 is affirmative (FB=1), the routine jumps to the step S10. When the decision at the step S14 is negative (FB=0), the routine jumps to the step S13.

Figure 6:
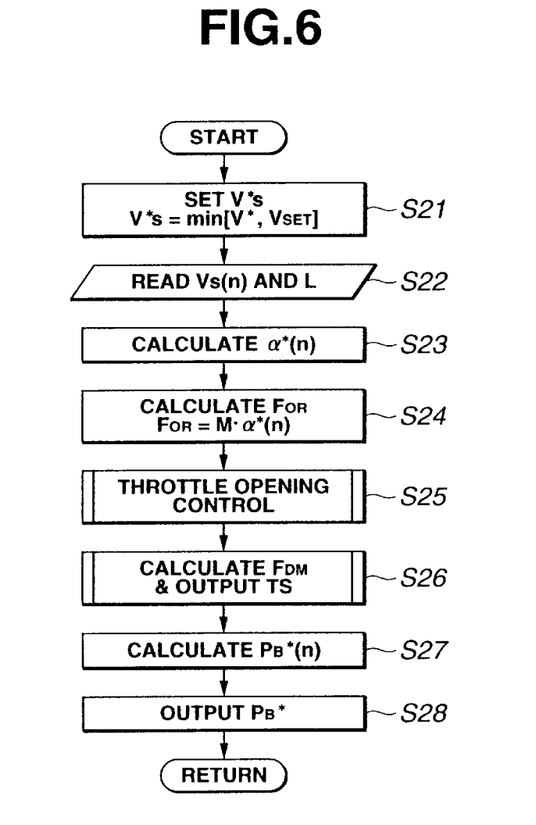
FIG. 6 is a flowchart showing a vehicle speed control process of the vehicle speed control computing process.

The vehicle speed control process of the step S13 is shown by a flowchart of FIG. 6 and is executed when the step S13 of the vehicle control calculating process is executed.

At a step S21, the follow-up controller 20 reads the target vehicle speed $V^*$ calculated at the vehicle-to-vehicle distance control section 40 and the set vehicle speed $V_{set}$ set by the driver. Further, the follow-up controller 5 sets a smaller one of the target vehicle $V^*$ and the set vehicle speed $V_{set}$ as a selected target vehicle speed $V^*s$.

At a step S22, the follow-up controller 20 reads the controlled-vehicle speed Vs(n) and the actual vehicle-to-vehicle distance L(n).

At a step S23, the follow-up controller 20 calculates the compensator outputs y1(n) and y2(n) by executing the calculation of the equations (10) and (11) corresponding to the compensators $C1(z^{-1})$ and $C2(z^{-1})$ of the robust compensator 51b, respectively, and calculates the disturbance output $\alpha 2(n)$ by executing the calculation of the following equation (12). Further, the follow-up controller 20 calculates the compensator output α1(n) by executing the calculation of the equation (13) corresponding to the model matching compensator 51a on the basis of the selected target vehicle speed V*s and the controlled-vehicle speed Vs. Furthermore, the follow-up controller 20 calculates the target acceleration α* by executing the calculation of the following equation (14) on the basis of the compensator outputs y1(n), y2(n) and α1(n). The follow-up controller 20 updates the target acceleration α*(n) by the calculated target acceleration α* and stores it in the storage region for the target acceleration. Further, the follow-up controller 20 updates the previous target acceleration α*(n−1) and stores the updated data in a storage region for the previous value of the target acceleration.

$$y1(n)=\gamma \cdot y1(n-1)+(1-\gamma)\cdot \alpha^*(n-1) \tag{10}$$

$$y2(n)=\gamma \cdot y2(n-1)+(1-\gamma)/T\cdot Vs(n)-(1-\gamma)/T\cdot Vs(n-1) \tag{11}$$

$$\alpha 2(n)=y2(n)-y1(n) \tag{12}$$

$$\alpha 1(n)=K\cdot(V^* sn)-Vs(n)) \tag{13}$$

$$\alpha^*=\alpha 1(n)+\alpha 2(n) \tag{14}$$

At a step S24, the follow-up controller 20 calculates the target driving/braking force $F_{OR}$ ($F_{OR}=M\cdot\alpha^*(n)$) by multiplying the vehicle weight M and the target acceleration α*(n).

At a step S25, the follow-up controller 20 calculates a target engine torque $T_E$ from the target driving/braking force $F_{OR}$. Further, the follow-up controller 20 calculates the throttle opening θ from the target engine torque $T_E$ and with reference to mapped data showing a nonlinear characteristic between the throttle opening θ and the engine torque by each engine rotation speed $N_E$, and outputs the obtained throttle opening θ indicative signal to the engine output control unit 9. The mapped data has been previous prepared and stored in the storage section of the follow-up controller 20.

At a step S26, the follow-up controller 20 calculates the deceleration force margin $F_{DM}$ by executing the calculation corresponding to the calculation at the deceleration force margin calculating section 52. Further, the follow-up controller 20 controls the shift change (upshift and downshift) of the automatic transmission 3 on the basis of the deceleration force margin $F_{DM}$ and the relative speed ΔV. More specifically, the follow-up controller 20 calculates the maximum deceleration at the fourth speed (OD) shift position on the basis of the target vehicle speed V* and with reference to the mapped data for calculating the maximum deceleration which has been previously prepared and stored in the follow-up controller 20. Further, the follow-up controller 20 calculates the target deceleration force $F_{BMAX}$ by multiplying the value (M/total gear ratio) and the maximum deceleration $\alpha_{OD}$, and calculates the demand deceleration force $F_D$ by executing the low-pass filter treatment as to the target driving/braking force $F_{OR}$, and calculates the deceleration force margin $F_{DM}$ by subtracting the maximum deceleration force $F_{DMAX}$ from the deceleration force demand value $F_D$. When the deceleration force margin $F_{DM}$ is greater than the upshift threshold $TH_U$, and when the relative speed ΔV takes a positive value, the follow-up controller 20 sets the logic value of the OD forbidding signal TS at 0 and outputs the signal to the transmission control unit 10 to allow the automatic transmission 3 to be set at the fourth speed (OD) shift position. When the deceleration force margin $F_{DM}$ is smaller than the downshift threshold $T_{HD}$ and when the relative speed ΔV takes a negative value, the follow-up controller 20 sets the logic value of the OD inhibiting signal TS at 1 and outputs the signal to the transmission control unit 10 to forbid the automatic transmission 3 to be set at the fourth speed (OD) shift position.

Figure 7:
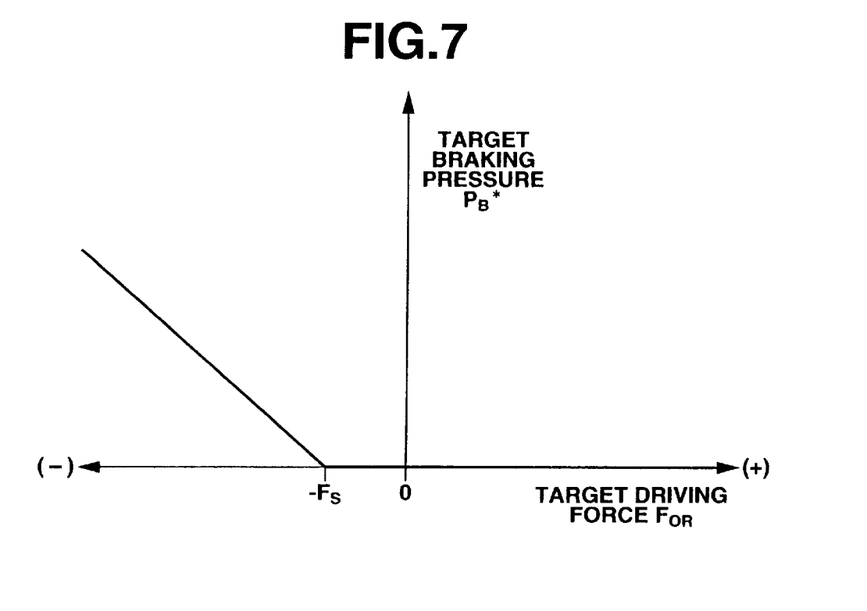
FIG. 7 is a graph showing a relationship between the target braking, driving force and the target braking pressure.

At a step S27, the follow-up controller 20 calculates the target braking pressure $P_B^*(n)$ on the basis of the target driving/braking force $F_{OR}$ and the mapped data corresponding to the target braking pressure calculation map shown in FIG. 7. As is clearly shown in FIG. 7, the x-axis is the target driving/braking force $F_{OR}$, and the y-axis is the target braking pressure $P_B^*$. In this graph, when the target driving/braking force $F_{OR}$ takes a positive value or a negative value greater than a predetermined value −Fs ($F_{OR}>-Fs$), the target braking pressure $P_B^*$ takes 0. Further, when the target driving/braking force $F_{OR}$ becomes smaller than the negative value −Fs ($F_{OR}<-Fs$), the target braking pressure $P_B^*$ linearly increases according to the decrease of the target driving/braking force $F_{OR}$.

At a step S28, the follow-up controller 20 outputs the target braking pressure $P_B^*(n)$ to the brake control unit 8. Thereafter, this sub-routine returns to the main routine by terminating the vehicle control calculating process shown in FIG. 4.

In the vehicle control calculating process shown in FIG. 4, the process of the step S3 corresponds to a decision vehicle-speed detecting means, the process of the step S4 and the accelerator switch 14 correspond to a acceleration operation detecting means, the process of the steps S5 to S12 corresponds to the deceleration priority control means, and the process of the step S13 corresponds to a vehicle speed control means.

Figure 8A:
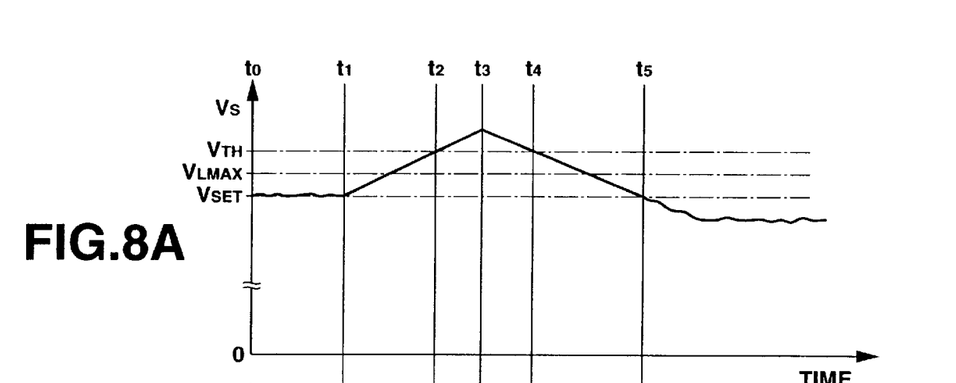
FIGS. 8A, 8B and 8C are time charts showing a vehicle speed control condition of the first embodiment.
Figures 8B, 8C:
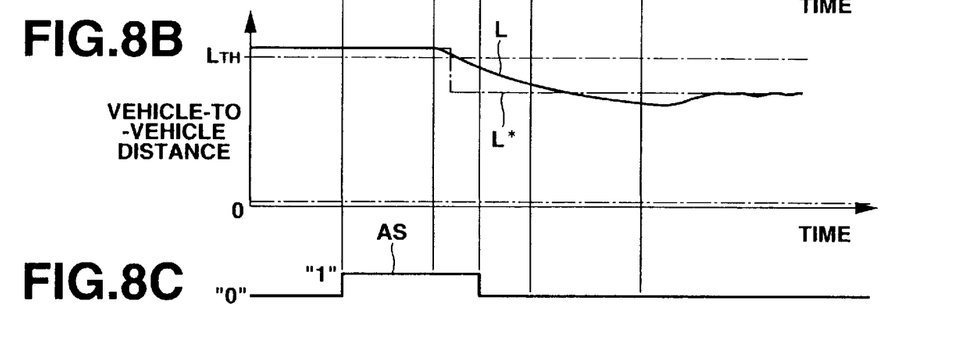

With reference to FIGS. 8A to 8C, the manner of operation of the first embodiment according to the present invention will be discussed hereinafter.

Now, it is assumed that at a moment t0 the controlled vehicle 100 travels on a straight highway at the set vehicle speed $V_{SET}$ of the follow-up control condition, under a condition that the set vehicle speed $V_{SET}$ is set at 100 km/h almost near the upper limit $V_{LMAX}$ in the allowable range of the set vehicle speed $V_{SET}$, the accelerator pedal is released and no preceding vehicle is not recognized, as shown in FIG. 8A.

Under this assumed traveling condition, the detected vehicle-to-vehicle distance L is greater than the threshold $L_{TH}$. Therefore, when the vehicle control calculating process shown in FIG. 4 is executed, the routine proceeds from the step S2 to the step S3 wherein it is decided the controlled-vehicle speed Vs is smaller than the control continuation deciding value $V_{TH}$. Accordingly, the routine proceeds to the step S14. Since the braking flag FB is reset (FB=0), the decision at the step S15 is negative, and therefore the routine proceeds to the step S13 to execute the vehicle speed control process shown in FIG. 6.

At this moment, since the actual vehicle-to-vehicle distance L is limited by the upper value greater than the threshold $L_{TH}$ as shown in FIG. 8B at the vehicle-to-vehicle distance control section 40, the target vehicle-to-vehicle distance L* takes a large value, and the target vehicle speed V* takes a value greater than the set vehicle speed $V_{SET}$. Therefore, at the step S21 the set vehicle speed $V_{SET}$ is set as the selected target vehicle speed V*s. At the step S23, the target acceleration/deceleration α* is calculated according to a difference between the selected target vehicle speed V*s and the controlled-vehicle speed Vs and takes a negative or positive value near 0. Further, the target driving/braking force $F_{OR}$ is calculated by multiplying the vehicle weight M and the target acceleration α*, and therefore the engine output control unit 9 controls the throttle opening so as to maintain the selected target vehicle speed V*s. Furthermore, the deceleration force margin $F_{DM}$ becomes greater than the downshift threshold $TH_D$ and therefore the logic value of the OD inhibiting signal TS becomes 0 and is outputted to the transmission control unit 10. Therefore, the automatic transmission 3 is set at the fourth speed (OD) shift position, and the target driving/braking force $F_{OR}$ takes a small value. Further, the target braking pressure PB * becomes 0, and therefore the brake control unit 8 puts the disc brakes 7 in an inoperative state.

At a moment t1 when the accelerator pedal is depressed by the driver to increase the controlled-vehicle speed Vs under a condition that no preceding vehicle is caught and the controlled vehicle 100 travels at the constant vehicle speed, the logic value of the switch signal AS of the accelerator switch 14 is turned to "1" as shown in FIG. 8C. Accordingly, the routine of the vehicle control calculating process proceeds from the step S3 to the step S14 where the negative decision is outputted, and therefore the routine proceeds to the return step to terminate the present routine. Since the vehicle speed control process to be executed at the step S13 is not executed, the acceleration of the controlled vehicle 100 based on the driver's demand is continued.

At a moment t2 when the controlled-vehicle speed Vs becomes greater than or equal to the control continuation decision value $V_{TH}$, the routine of the vehicle speed control process shown in FIG. 4 proceeds from the step S3 to the step S4. Since the depression of the accelerator pedal is maintained, the decision of the step S4 is negative, and therefore the routine jumps to the return step to terminate the present routine. Accordingly, the acceleration of the controlled vehicle 100 based on the driver's demand is continued.

Thereafter, at a moment t3 when the controlled vehicle 100 catches a preceding vehicle traveling at a vehicle speed smaller than that of the controlled vehicle 100 and therefore the actual vehicle-to-vehicle distance L becomes smaller than the threshold $L_{TH}$ and the target vehicle-to-vehicle distance L*, if the driver releases the accelerator pedal, the routine of the vehicle control calculating process of FIG. 4 proceeds from the step S4 to the step S5. Since the preceding vehicle is recognized (caught), the routine proceeds from the step S5 through the step S6 to the step S7 wherein the target deceleration β* is calculated. Further, the target braking pressure $P_B$* is calculated at the step S8, and the deceleration flag FB is set at 1 at the step S9.

The throttle opening command value θ set at 0 is outputted to the engine output control unit 9, and therefore the throttle valve is put in the full close state. Further, the disc brakes 7 generate the braking force corresponding to the target braking pressure $P_B$*, and therefore the controlled vehicle 100 is decelerated. At this moment, since the controlled-vehicle speed Vs is greater than the set vehicle speed $V_{SET}$, the decision at the step S11 becomes negative. Therefore, the routine jumps to the return step to terminate the present routine without executing the step S13. Accordingly, the stopped state of the vehicle speed control process is maintained.

After a timer interruption cycle elapsed, the next routine of the vehicle control calculating process of FIG. 4 is started. At this period, although the controlled-vehicle speed Vs is decelerated, it is kept at a value greater than the control continuation decision value $V_{TH}$. Therefore, the routine proceeds from the step S3 through the steps S4 and S5 to the step S6 wherein the decision becomes affirmative. The routine therefore proceeds to the step S10 wherein the throttle opening is kept at 0 and the braking force corresponding to the target braking force $P_B$* is generated continuously.

Accordingly, the controlled-vehicle speed Vs is decelerated at a rate of a constant deceleration. Then, at a moment t4 when the controlled-vehicle speed Vs becomes smaller than the control continuation decision value $V_{TH}$, the routine of the vehicle control calculating process of FIG. 4 proceeds from the step S3 to the step S14 wherein the negative decision is made since the switch signal AS is set at 1. Further, the routine proceeds to the step S15 wherein the negative decision is made since the deceleration flag is set at 1. Consequently, the routine proceeds to the step S10 wherein the deceleration control for decreasing the vehicle speed at a rate of the constant deceleration is executed.

At a moment t5 when the controlled-vehicle speed Vs becomes smaller than or equal to the set vehicle speed $V_{SET}$ under a condition that the deceleration control is executed, the routine proceeds from the step S11 to the step S12 wherein the deceleration flag FB is set at 0 (FB=0), and then proceeds to the step S13 wherein the vehicle speed control process is restarted. Accordingly, the follow-up control based on the target vehicle speed V for maintaining the actual vehicle-to-vehicle distance L at the target vehicle-to-vehicle distance L* is executed.

Under a condition that the set vehicle speed $V_{SET}$ is set at a value near the settable upper limit speed $V_{LMAX}$ and that the controlled vehicle 100 follows up a preceding vehicle traveling at a vehicle speed smaller than the set vehicle speed $V_{SET}$, when the detecting condition of the preceding vehicle is changed to the undetected condition by the reason that the vehicle speed of the preceding vehicle is changed to a speed higher than the set vehicle speed $V_{SET}$ or that the preceding vehicle changes a lane of the traveling road, the controlled-vehicle speed Vs is increased to the set vehicle speed $V_{SET}$ and is maintained at the set vehicle speed $V_{SET}$. When the driver executes the acceleration of the controlled vehicle 100 under this condition, the processing as same as that mentioned in the above case is executed.

Furthermore, the acceleration of the controlled vehicle 100 is executed according to the driver's demand under a condition that the controlled vehicle 100 travels at the set vehicle speed $V_{SET}$ or follows up the preceding vehicle traveling at a vehicle speed smaller than the set vehicle speed $V_{SET}$. Then, the acceleration of the controlled vehicle 100 is stopped before the controlled-vehicle speed Vs reaches the control continuation decision value $V_{TH}$. In this situation, the routine of the vehicle control calculating process of FIG. 4 proceeds from the step S3 through the step S14 to the step S15 wherein the negative decision is made since the deceleration flag FB is reset at 0 (FB=0). Accordingly, the routine proceeds to the step S14 where the vehicle speed control process is executed without the execution of the deceleration control. Therefore, when the preceding vehicle is caught, the vehicle speed control is executed so as to bring the vehicle-to-vehicle distance L closer to the target vehicle-to-vehicle distance L*. When no preceding vehicle is caught, the vehicle speed control is executed so as to bring the controlled-vehicle speed Vs closer to the set vehicle speed $V_{SET}$.

With the thus arranged first embodiment according to the present invention, when the controlled vehicle 100 is accelerated according to the driver's demand under that condition that the controlled vehicle travels on a highway at a constant speed of the set vehicle speed $V_{SET}$ near the settable upper limit $V_{LMAX}$ and when the acceleration of the controlled vehicle 100 is terminated after the controlled-vehicle speed Vs becomes greater than the control continuation decision value $V_{TH}$ and the preceding vehicle is caught, the deceleration control for decreasing the vehicle speed V at a rate of the constant deceleration set according to the difference between the controlled-vehicle speed Vs and the set vehicle speed $V_{SET}$ prior to the vehicle speed control process. Therefore, the deceleration of the controlled-vehicle speed Vs is suitably and stably executed without temporally generating the quick deceleration. Further, at this period, the deceleration control is continued until the controlled-vehicle speed Vs becomes smaller than the set vehicle speed $V_{SET}$, it is possible to firmly avoid the drier from feeing a quick deceleration feeling at a timing that the vehicle speed control based on the vehicle-to-vehicle distance is started. Furthermore, since the driver's demand of acceleration is detected from the accelerator switch 14, the detection of the driver's demand is firmly executed with occurring misdetection.

Although the first embodiment according to the present invention has been shown and described such that the acceleration operation based on the driver's demand is detected by the accelerator switch 14, it will be understood that the present invention is not limited to this and may be indirectly detected by deciding whether the difference between the throttle opening command value θ and the actual throttle opening $θ_R$ is greater than a predetermined value.

Further, although the first embodiment has been shown and described such that the target braking pressure $P_B$ is calculated with reference to the mapped data corresponding to the target braking pressure map shown in FIG. 5, it will be understood that the present invention is not limited to this and may be calculated from an equation representative of the characteristic line of FIG. 5. Furthermore, while the first embodiment has been shown and described such that the target deceleration for obtaining the constant deceleration is calculated on the basis of the controlled-vehicle speed Vs and the set vehicle speed $V_{SET}$, it will be understood that the present invention is not limited to this and may be previously set at a predetermined value.

Figure 9:
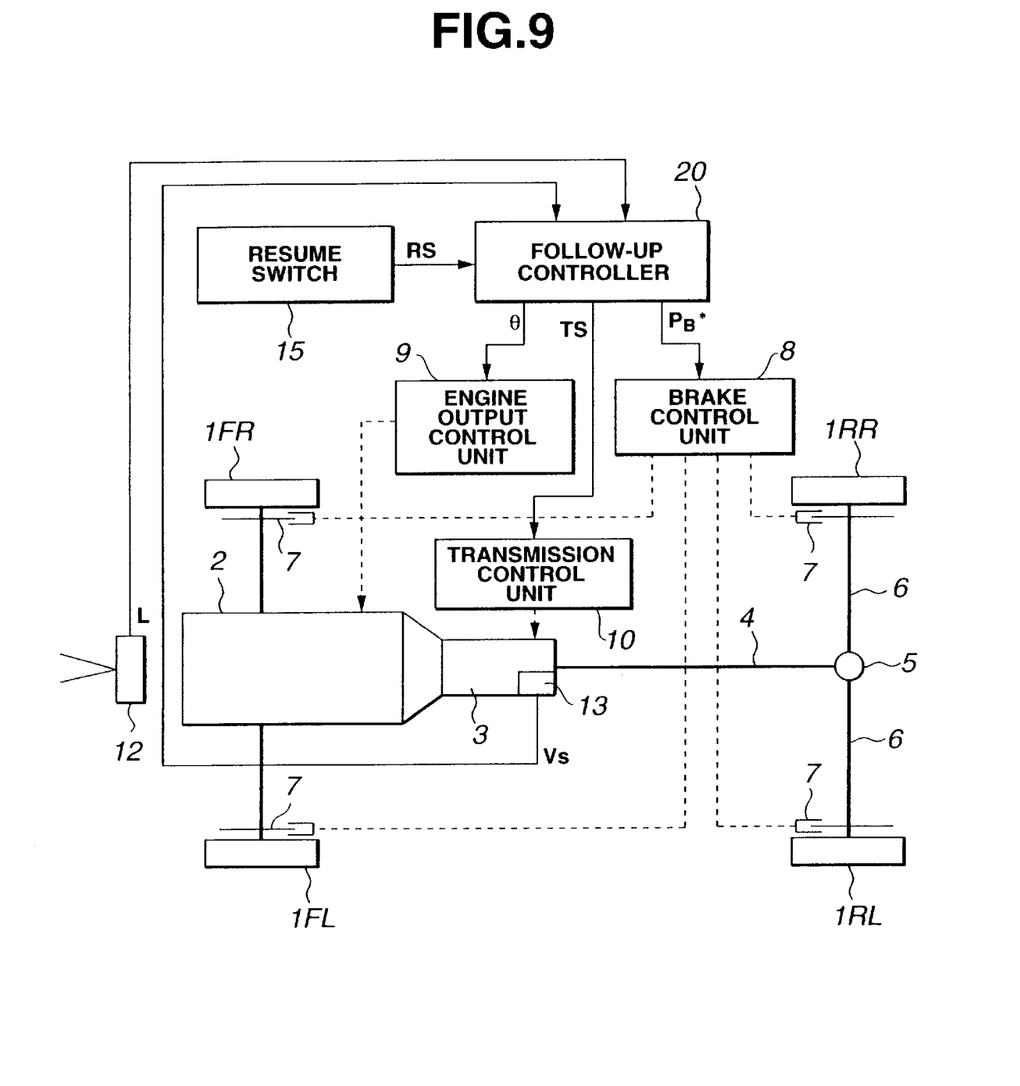
FIG. 9 is a schematic view showing a construction of a second embodiment of a preceding vehicle follow-up control system according to the present invention.
Figure 10:
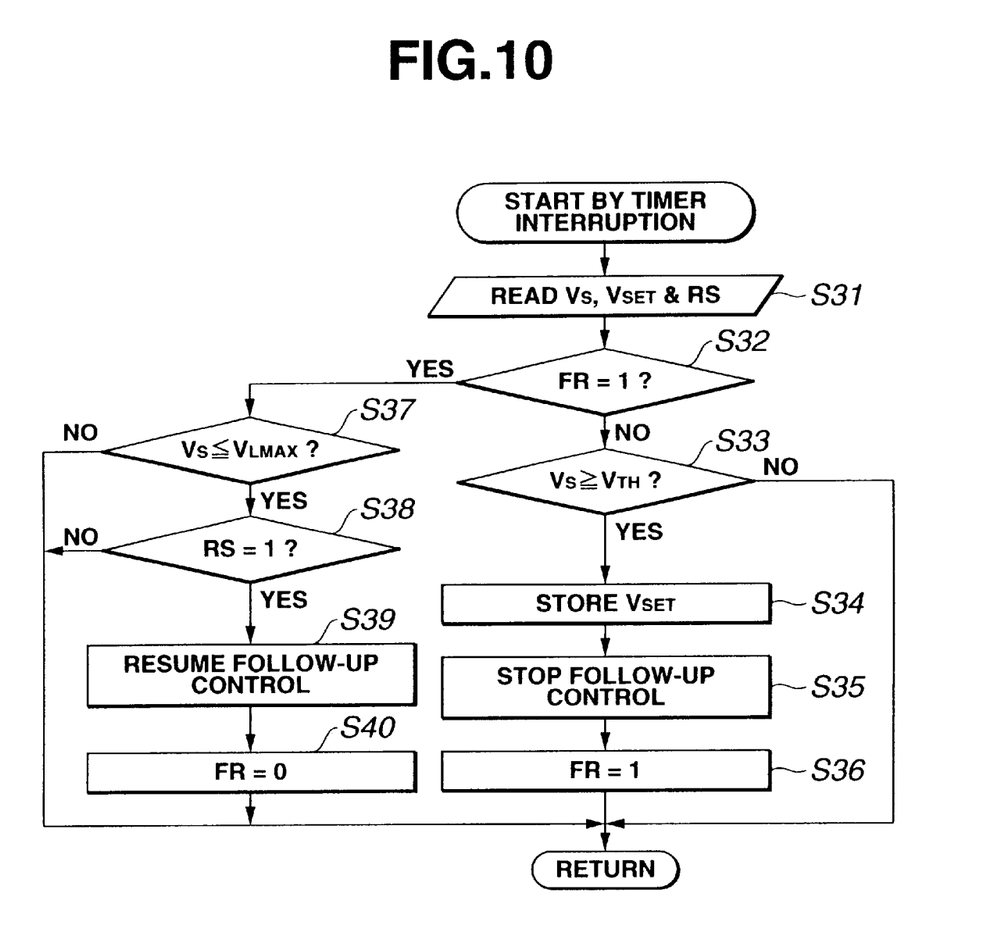
FIG. 10 is a flowchart showing a follow-up control managing process executed in the second embodiment of FIG. 9.

Referring to FIGS. 9 and 10, there is shown a second embodiment of the preceding vehicle follow-up control system according to the present invention.

The second embodiment according to the present invention is arranged to resume the follow-up control after the deceleration control based on the driver's demand is executed instead of the automatic execution of the deceleration control when the acceleration based on the driver's demand is terminated. More specifically, the construction of the second embodiment is generally similar to that of the first embodiment as shown in FIG. 9 except that the accelerator switch 14 is omitted and that a resume switch 15 functioning as a control resume commanding means for commanding the resume of the follow-up control is installed near a driver's seat. A switch signal RS of the resume switch 15 is inputted to the follow-up controller 20. Same reference numerals denote same elements and parts of the first embodiment, and the explanation thereof is omitted herein. Additionally, the follow-up controller 20 of the second embodiment is arranged to execute only the vehicle speed control process shown in FIG. 6 while omitting the vehicle control calculating process of FIG. 4. Furthermore, the follow-up control managing process is executed at predetermined intervals (10 msec) as a timer interruption processing. The follow-up control managing process is executed by the following step shown in FIG. 10.

At a step S31, the follow-up controller 20 reads the controlled-vehicle speed Vs, the set vehicle speed $V_{SET}$ and the switch signal RS of the resume switch 15.

At a step S32, the follow-up controller 20 decides whether a control decision flag FR indicative of cancellation of the follow-up control is set at 1 or not. When the decision at the step S32 is affirmative (FR=1), that is, when the follow-up control is cancelled, the routine proceeds to a step S37. When the decision at the step S32 is negative (FR=0), that is, when the follow-up control is being executed, the routine proceeds to a step S33.

At the step S33, the follow-up controller 20 decides whether or not the controlled-vehicle speed Vs is greater than or equal to the control continuation decision value $V_{TH}$ set at the value greater than the upper limit $V_{LMAX}$ in the settable range. When the decision at the step S33 is affirmative (Vs≧$V_{TH}$), the follow-up controller 20 decides that the follow-up control is continued, and therefore the routine proceeds to a step S34. When the decision at the step S33 is negative (Vs<$V_{TH}$), the follow-up controller 20 decides that the follow-up control is stopped, and therefore the routine jumps to a return step to terminate the present timer interruption routine.

At the step S34, the follow-up controller 20 stores the set vehicle speed $V_{SET}$ in a predetermined storage region.

At a step S35, the follow-up controller 20 cancels (stops) the follow-up control process executed at the vehicle-to-vehicle distance control section 40 and the vehicle speed control section 50.

At a step S36, the follow-up controller 20 sets the control flag FR at 1 (FR=1) and thereafter proceeds to the return step to terminate the present timer interruption routine.

At the step S37 following to the affirmative decision at the step S32, the follow-up controller 20 decides whether the controlled-vehicle speed Vs is smaller than or equal to the set upper limit $V_{LMAX}$ When the decision at the step S37 is negative (Vs>$V_{LMAX}$), the routine proceeds to the return step. When the decision at the step S37 is affirmative (Vs≦$V_{LMAX}$), the routine proceeds to a step S38.

At the step S38, the follow-up controller 20 decides whether the switch signal RS of the resume switch 15 takes the logic value "1" or not. When the decision at the step S38 is negative (RS=0), the follow-up controller 20 decides that the driver does not command the resume of the follow-up control, the routine jumps to the return step. When the decision at the step S38 is affirmative (RS=1), the follow-up controller 20 decides that the driver commands the resume of the follow-up control, the routine proceeds to a step S39.

At the step S39, the follow-up controller 20 resumes the follow-up control by restarting the follow-up control process executed by the vehicle-to-vehicle distance control section 40 and the vehicle speed control section 50.

At a step S40, the follow-up controller 20 resets the control flag FR at 0 (FR=0). Thereafter, the routine proceeds to the return step to terminate the present timer interruption routine.

In the follow-up control managing process of FIG. 10, the processing at the step S34 corresponds to the set vehicle speed storing means, the processing at the step S35 corresponds to a control canceling means, and the processing at the steps S37 to S39 correspond to a control resuming means.

With the thus arranged second embodiment according to the present invention, the driver can accelerate the vehicle speed Vs by depressing the accelerator pedal, when the controlled vehicle 100 can accelerate its vehicle speed due to the condition that the controlled vehicle 100 travels on a highway and the detecting state of a preceding vehicle is turned from a detected state to an undetected state by the acceleration of the preceding vehicle, the lane change of the preceding vehicle or of the controlled vehicle 100. Thereafter, during a period when the controlled-vehicle speed Vs reaches the control continuation decision value $V_{TH}$, the follow-up control is executed by the vehicle-to-vehicle distance control section 30 and the vehicle speed control section 50. Further, when the acceleration of the controlled vehicle 100 is terminated, the follow-up control is immediately executed.

However, When the controlled vehicle speed Vs becomes greater than or equal to the control continuation decision value $V_{TH}$, the routine of the follow-up control managing process shown in FIG. 10 proceeds from the step S33 to the step S34 wherein the set vehicle speed $V_{SET}$ is stored in the set vehicle speed storage region. Then, the routine proceeds to the step S35 wherein the follow-up control process executed by the vehicle-to-vehicle distance control section 40 and the vehicle speed control section 50 is cancelled to put the controlled vehicle in the follow-up cancelled state. Further, the follow-up controller 20 sets the control flag FR at 1 (FR=1) at the step S36.

Accordingly, by gradually canceling the depression of the accelerator pedal from the time that the controlled vehicle 100 reaches the follow-up position after the controlled-vehicle speed Vs becomes greater than the control continuation decision value $V_{TH}$. The operating condition of the controlled vehicle 100 is put in a normal condition controlled by the driver, and therefore, the driving force of the engine 2 is gradually decreased and the controlled-vehicle speed Vs gradually decreases. However, during a period until the controlled vehicle speed Vs becomes smaller than or equal to the set speed upper limit $V_{LMAX}$, the negative decision is made at the step S37 so as to jump to the return step to terminate the present timer interruption routine. Accordingly, the resume of the follow-up control is inhibited during this period. When the controlled vehicle speed Vs becomes smaller than the set speed upper limit $V_{LMAX}$, the affirmative decision is made at the step S37, and therefore the routine of the follow-up control managing process proceeds to the step S38. Since the switch signal SR of the resume switch 15 takes the logic value "1" at the step S38, the routine proceeds to the step S39 wherein the follow-up control process executed by the vehicle-to-vehicle distance control section 40 and the vehicle speed control section 50 is resumed. At this time, the set vehicle speed $V_{SET}$ stored in the set vehicle speed storage region is employed as the present set vehicle speed $V_{SET}$. Therefore, the follow-up control is smoothly restarted without a new operation for setting the set vehicle speed.

With the thus arranged second embodiment according to the present invention, when the controlled-vehicle speed Vs becomes greater than or equal to the control continuation decision value $V_{TH}$ by the acceleration based on the driver's demand, the follow-up control is automatically cancelled, and the follow-up control is not resumed at the time that the acceleration is terminated. Therefore, quick deceleration due to the resume of the follow-up control does not generate. When the controlled vehicle speed Vs becomes smaller than or equal to the set speed upper limit $V_{LMAX}$ due to the control of the throttle opening or braking operation based on the driver's demand, it becomes possible to resume the follow-up control. By turning on the resume switch 15 in this state, the follow-up control state is resumed. This prevents the quick deceleration due to the resume of the follow-up control and enables the driver to avoid receiving the strange feeling.

Although the second embodiment according to the present invention has been shown and described such that the resume switch 15 is employed as a control resume commanding means, it will be understood that the present invention is riot limited to this and may employ other switch or proper commanding means.

While the first and second embodiments according to the present invention have been shown and described such that the control continuation decision value $V_{TH}$ is set at the value greater than the upper limit of the settable range by 10 km/h, it will be understood that the present invention is not limited to this and may be set other proper value greater than the upper limit $V_{LMAX}$.

Further, although the first and second embodiments according to the present invention have been shown and described such that the control continuation decision value $V_{TH}$ is a constant value, it will be understood that the present invention is not limited to this and may be arranged to provide first and second control continuation decision values $V_{TH1}$ and $V_{TH2}$ ($V_{TH1}<V_{TH2}$), to execute the process as same as that of the first embodiment when the controlled-vehicle speed Vs is greater than the first control continuation decision value $V_{TH1}$ and is smaller than the second control continuation decision value $V_{TH2}$ and when the acceleration operation is terminated, and to execute the process as same as that of the second embodiment when the controlled-vehicle speed Vs is greater than the second control continuation decision value $V_{TH2}$.

While the embodiments according to the present invention have been shown and described such that the follow-up controller 20 executes the vehicle speed control process through the execution of a software, it will be understood that the present invention is not limited to this and may be arranged to employ a hardware constituted by an electronic circuit including a function generator, a comparator, a computing element and so on. Further, although the embodiment according to the present invention has been shown and described to be applied to a rear-wheel drive vehicle, this may be applied to a front-wheel drive vehicle. In addition, although the embodiment according to the present invention has been shown and described to employ the engine 110 as a rotation drive source, it will understood that the present invention is not limited to this and may employ an electric motor, and may be applied to a hybrid vehicle employing an engine and an electric motor.

The entire contents of Japanese Patent Application No. 11-168264 filed on Jun. 15, 1999 in Japan are incorporated herein by reference.

Although the invention has been described above by reference to a certain embodiment of the invention, the invention is not limited to the embodiments described above. Modifications and variations of the embodiment described above will occur to those skilled in the art, in light of the above teaching. The scope of the invention is defined with reference to the following claims.

What is claimed is:

1. A preceding vehicle follow-up control system for a vehicle, comprising:
   a vehicle-to-vehicle distance detector that detects a distance between a controlled vehicle and a preceding vehicle and outputs a signal indicative of the vehicle-to-vehicle distance;
   a vehicle speed detector that detects a vehicle speed of the controlled vehicle and outputs a signal indicative of the controlled-vehicle speed;
   an accelerating operation detector that detects whether an accelerating operation based on a driver's demand is executed; and
   a controller connected to said vehicle-to-vehicle distance detector, said vehicle speed sensor and said accelerating operation detector, said controller being arranged to calculate a target vehicle speed employed for bringing the vehicle-to-vehicle distance closer to a target vehicle-to-distance on the basis of the vehicle-to-vehicle distance and the controlled-vehicle speed, to control the controlled-vehicle speed to bring the controlled-vehicle speed closer to the target vehicle speed, to detect whether the controlled-vehicle speed is greater than a control continuation decision value which is greater than an upper limit of a settable range of a set vehicle speed, to decelerate the controlled-vehicle speed to the set vehicle speed at a rate of a preset deceleration when the controlled-vehicle speed is greater than the control continuation decision value and when the accelerating operation is not executed.

2. The preceding vehicle follow-up control system as claimed in claim 1, wherein said acceleration detector includes one of a detector for detecting a depression of an accelerator pedal and a depression detecting means for detecting the depression of the accelerator pedal on the basis of a difference between an actual throttle opening and a throttle opening command value outputted from said controller during when said controller executes controlling the vehicle speed.

3. The preceding vehicle follow-up control system as claimed in claim 1, wherein the driver sets the set vehicle speed within the settable range.

4. The preceding vehicle follow-up control system as claimed in claim 1, wherein said controller is connected to a brake control unit for controlling a braking force generated by disc brakes, an engine output control unit for controlling an output of an internal combustion engine and a transmission control unit for controlling a shift position of an automatic transmission.

5. The preceding vehicle follow-up control system as claimed in claim 1, wherein said controller stores a first control continuation value greater than the upper limit in the settable range of the set vehicle speed and a second control continuation value greater than the first control continuation value, said controller decelerates the controlled-vehicle speed to the set vehicle speed at a rate of a preset deceleration when the controlled-vehicle speed is greater than the first control continuation decision value and smaller than the second control continuation decision value and when the accelerating operation is not executed, said controller stops calculating the target vehicle speed and controlling the controlled-vehicle speed when the controlled-vehicle speed is greater than the second control continuation decision value, and said controller resumes calculating the target vehicle speed and controlling the controlled-vehicle speed to be executed based on the set vehicle speed stored in the storage region said after calculating the target vehicle speed and controlling the controlled-vehicle speed are stopped and when the controlled-vehicle speed is smaller than the upper limit of the settable range of the set vehicle speed and when a driver's demand for resuming the follow-up control is inputted to said controller.

6. The preceding vehicle follow-up control system as claimed in claim 5, wherein said controller limits the shift position of the automatic transmission through the transmission control unit on the basis of a magnitude of a deceleration of the controlled-vehicle speed and a relative speed between the controlled vehicle and a preceding vehicle.

7. The preceding vehicle follow-up control system as claimed in claim 5, wherein said controller calculates a target braking pressure for generating a target acceleration of the controlled vehicle by outputting a control command to the brake control unit.

8. A preceding vehicle follow-up control system for a vehicle, comprising:

a vehicle-to-vehicle distance detector that detects a distance between a controlled vehicle and a preceding vehicle and outputs a signal indicative of the vehicle-to-vehicle distance;

a vehicle speed detector that detects a vehicle speed of the controlled vehicle and outputs a signal indicative of the controlled-vehicle speed;

an accelerating operation detector that detects whether an accelerating operation based on a driver's demand is executed;

a control resume switch through which a driver of the controlled vehicle outputs a control resume command; and a controller connected to said vehicle-to-vehicle distance detector, said vehicle speed sensor, said accelerating operation detector and said control resume switch, said controller being arranged to calculate a target vehicle speed employed for bringing the vehicle-to-vehicle distance closer to a target vehicle-to-distance on the basis of the vehicle-to-vehicle distance and the controlled-vehicle speed, to control the controlled-vehicle speed to bring the controlled-vehicle speed closer to the target vehicle speed, to detect whether the controlled-vehicle speed is greater than a control continuation decision value which is greater than an upper limit of a settable range of a set vehicle speed, to store the set vehicle speed in a storage region, to stop calculating the target vehicle speed and controlling the controlled-vehicle speed when the controlled-vehicle speed is greater than the control continuation decision value, and to resume calculating the target vehicle speed and controlling the controlled-vehicle speed to be executed based on the set vehicle speed stored in the storage region after calculating the target vehicle speed and controlling the controlled-vehicle speed are stopped and when the controlled-vehicle speed is smaller than the upper limit of the settable range of the set vehicle speed and when said control resume switch outputs the control resume command.

9. A preceding vehicle follow-up control system for a vehicle, comprising:

vehicle-to-vehicle distance detecting means for detecting a distance between a controlled vehicle and a preceding vehicle;

controlled-vehicle speed detecting means for detecting a vehicle speed of the controller vehicle;

vehicle-to-vehicle distance controlling means for calculating a target vehicle speed for bringing the detected vehicle-to-vehicle distance closer to a target vehicle-to-vehicle distance on the basis of the vehicle-to-vehicle distance and the controlled-vehicle speed; and controlled-vehicle speed controlling means for controlling the controlled-vehicle speed to bring the controlled-vehicle speed closer to the target vehicle speed;

decision-speed achievement detecting means for detecting that the controlled-vehicle speed is greater than a control continuation decision value which is greater than an upper limit of a settable range of a set vehicle speed;

acceleration detecting means for detecting whether an accelerating operation of a driver's demand is executed;

prior deceleration controlling means for decelerating the controlled-vehicle speed to the set vehicle speed by a preset deceleration when the controlled-vehicle speed is greater than the control continuation decision value and when said acceleration detecting means detects that the accelerating operation is not executed.

10. A preceding vehicle follow-up control system for a vehicle, comprising:

vehicle-to-vehicle distance detecting means for detecting a distance between a controlled vehicle and a preceding vehicle;

controlled-vehicle speed detecting means for detecting a vehicle speed of the controller vehicle;

vehicle-to-vehicle distance controlling means for calculating a target vehicle speed for bringing the detected vehicle-to-vehicle distance closer to a target vehicle-to-vehicle distance on the basis of the vehicle-to-vehicle distance and the controlled-vehicle speed; and controlled-vehicle speed controlling means for controlling the controlled-vehicle speed to bring the controlled-vehicle speed closer to the target vehicle speed;

decision-speed achievement detecting means for detecting that the controlled-vehicle speed is greater than a control continuation decision value which is an upper limit of a settable range of a set vehicle speed;

set vehicle speed storing means for storing the set vehicle speed;

control resume commanding means for commanding resuming the execution of said vehicle-to-vehicle distance controlling means and said vehicle speed controlling means;

control canceling means for canceling the execution of said vehicle-to-vehicle distance controlling means and said vehicle speed controlling means when the controlled-vehicle speed is greater than the control continuation decision value; and control resuming means for resuming the execution of said vehicle-to-vehicle distance controlling means and said vehicle speed controlling means executed based on the set vehicle speed stored in said set vehicle speed storing means after the execution of said vehicle-to-vehicle distance controlling means and said vehicle speed controlling means is cancelled and when the controlled-vehicle speed is smaller than the upper limit of the settable range of the set vehicle speed and when said control resume commanding means commanding the resume of the execution of said vehicle-to-vehicle distance controlling means and said vehicle speed controlling means.

11. A method for following-up a preceding vehicle, comprising:

detecting a distance between a controlled vehicle and a preceding vehicle and outputs a signal indicative of the vehicle-to-vehicle distance;

detecting a vehicle speed of the controlled vehicle and outputs a signal indicative of the vehicle speed;

detecting whether an accelerating operation of a driver's demand is executed;

calculating a target vehicle speed employed for bringing the vehicle-to-vehicle distance closer to a target vehicle-to-distance;

controlling the controlled-vehicle speed to bring the controlled-vehicle speed closer to the target vehicle speed;

detecting whether the controlled-vehicle speed is greater than an upper limit of a settable range of a set vehicle speed; and decelerating the controlled-vehicle speed to the set vehicle speed by a preset deceleration when the controlled-vehicle speed is greater than the upper limit and when the accelerating operation is not executed.

* * * * *